United States Patent

Hallenstvedt et al.

[11] Patent Number: 5,509,323
[45] Date of Patent: Apr. 23, 1996

[54] TRANSMISSION DEVICE, ESPECIALLY A REVERSE GEAR FOR BOATS

[75] Inventors: Oddbjörn Hallenstvedt, Valskog; Kaj Skogman; Bo Kristiansson, both of Kungsör, all of Sweden

[73] Assignee: AB Volvo Penta, Gothenburg, Sweden

[21] Appl. No.: 230,520

[22] Filed: Apr. 20, 1994

[30] Foreign Application Priority Data

May 5, 1993 [SE] Sweden .......................... 9301541

[51] Int. Cl.⁶ .......................... F16H 3/14; F16D 13/26
[52] U.S. Cl. .......................... 74/378; 74/417; 192/51; 192/107 M
[58] Field of Search .......................... 192/107 M, 51, 192/48.91, 21; 74/378, 417

[56] References Cited

U.S. PATENT DOCUMENTS

| | | | |
|---|---|---|---|
| 3,269,497 | 8/1966 | Bergstedt | 192/51 |
| 3,365,039 | 1/1968 | Stott et al. | 192/107 M X |
| 4,091,904 | 5/1978 | Beyer | 192/107 M |
| 4,679,681 | 7/1987 | Creydt et al. | 192/107 M |
| 5,249,661 | 10/1993 | Kawamura et al. | 192/107 M |
| 5,407,043 | 4/1995 | Yamada | 192/107 M |

FOREIGN PATENT DOCUMENTS

| | | | |
|---|---|---|---|
| 4-73427 | 3/1992 | Japan | 192/107 M |
| 886844 | 1/1962 | United Kingdom | 192/107 M |

*Primary Examiner*—Rodney H. Bonck
*Attorney, Agent, or Firm*—Young & Thompson

[57] ABSTRACT

A reverse gear for boats, comprising a bevel gear transmission with two gears (4,5) rotatably mounted on a secondary shaft (8) and alternately engageable with the shaft by means of an engaging sleeve (11). The engaging sleeve is made of bronze and has outer engaging cones (12,13), which are coated with a surface layer of molybdenum. The rotatably mounted gears (4,5) have inner engaging cones (14,15) of case hardened steel. The molybdenum layer need be only about 0.1 mm thick and, contrary to molybdenum coatings on steel inner engaging cones of the prior art, need not be worked after deposition.

1 Claim, 1 Drawing Sheet

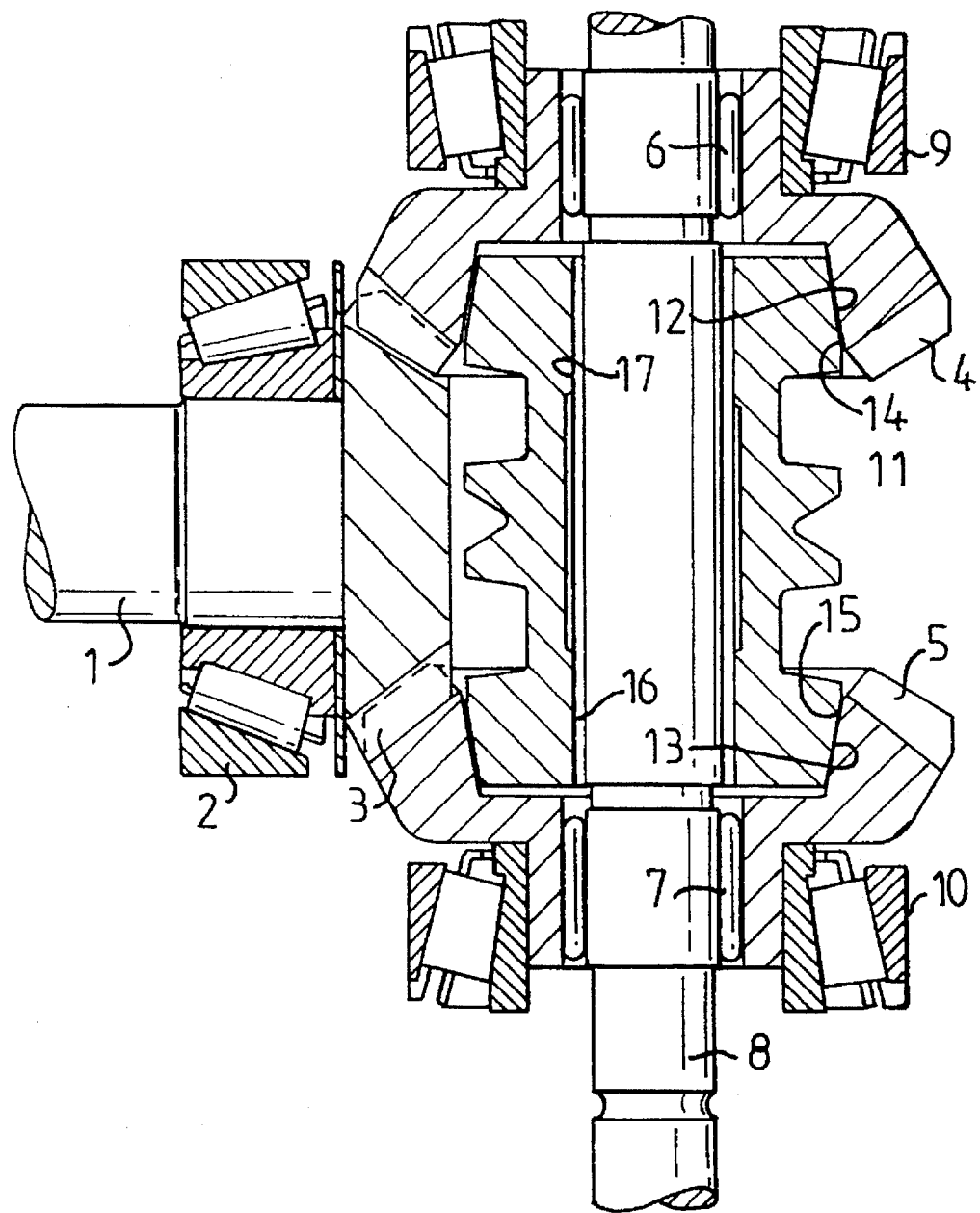

TRANSMISSION DEVICE, ESPECIALLY A REVERSE GEAR FOR BOATS

The present invention relates to a transmission device, especially a reverse gear for a boat motor, comprising a first shaft with a first gear non-rotatably fixed to the shaft, a second shaft mounted perpendicularly to the first shaft with two second gears freely rotatably mounted on said second shaft, and engaging the first gear and each having a individual inner conical frictional surface, and an engaging sleeve axially displaceable on the second shaft between said second gears, and having two external conical frictional surfaces facing away from each other which each cooperates with an individual one of said inner frictional surfaces to alternately lock the second gears to the second shaft.

Transmission devices of this type appear in a number of different variants of reverse gear mechanisms in boats, both in entirely inboard installations and in outboard drives, for example of the type Aquamatic®. SE-A-417 075 for example, shows and describes a reverse gear mechanism of the type described by way of introduction which is included in a basic transmission, which together with a number of different supplemental units, forms a module system.

These transmissions are presently used together with engines of more than 400 h.p. and must be able to transmit torque of more than 600 Nm. They must be able to withstand shifting without slipping or binding. This places great demands on the choice of materials and on maintaining small tolerances.

One design which has been used in the past few years and which has proved to meet demands as regards high torque transmission, operational reliability and long life, has an engaging sleeve and engaging, rings or tempered steel joined to the rotating gears. The internal conical frictional surfaces of the engaging rings are coated with a wear layer of molybdenum. All of these frictional surfaces are ground with very great precision in order to achieve evenness of surface, which is necessary to achieve the desired function. This has made it necessary to apply a relatively thick layer of molybdenum, of which approximately two thirds are ground off in finishing. Molybdenum is an expensive material and the grinding procedure used is relatively complicated, and this has resulted in relatively high costs for manufacturing the reverse gear mechanism despite its simple construction in principle.

The purpose of the present invention is to achieve a transmission device of the type described by way of introduction, which can be made at lower costs than the known transmission device described above, but which nevertheless has at least as high torque transmission capacity, reliability and useful life as said transmission device.

This is achieved according to the invention by virtue of the tact that each inner conical frictional surface is a surface on a steel body, while the respective outer conical frictional surface is a surface of a molybdenum layer on a bronze body.

In a preferred embodiment the engaging sleeve is made in its entirety in bronze. The frictional surface is a layer of molybdenum cirka 0.1 mm thick which has been sprayed on the conical surfaces of the sleeve. Surprisingly, it has been found that this layer does not need to be worked at all in order to achieve the desired properties. Tests have shown that the frictional surfaces, after 40,000 shifts, reveal only such small changes in the surface structure that they can hardly be discovered visually. A somewhat softer engagement is also achieved by the design according to the invention than in the previously known design without any tendencies to slip being noted.

Significant savings are achieved by the invention. Bronze is a material which is easy to work. Spraying a layer of molybdenum on the surface of an external cone instead of on an internal cone is simpler and makes it possible to apply a thin layer which does not need to be ground thus saving extensive material and eliminating a work step.

The invention will be described in more detail with reference to an example shown in the accompanying drawing, which shows a longitudinal section through a transmission device according to the invention.

The transmission shown in the Figure has an input shaft, which is mounted in a roller bearing 2 in a housing (not shown in detail here). On the shaft 1 a bevel gear 3 is non-rotatably fixed and engages two bevel gears 4, 5, which are mounted on needle bearings 6, 7 on a secondary shaft 8. The gears 4, 5 are also mounted in roller bearings 9, 10 in the housing (not shown), which can be the housing of a reverse gear for a completely inboard engine installation or a portion of a outboard drive. In both cases, the secondary shaft drives one or two (concentric) propeller shafts via a bevel transmission.

An engaging sleeve 11 is displaceably mounted on the secondary shaft 8, and has external conical frictional surfaces 12, 13, which when the sleeve 11 is displaced axially by means of an operating means (not shown), it can be brought into engagement with the internal conical frictional surfaces 14, 15 on the gears 4, 5 to non-rotatably join the gears 4 or 5 to the secondary shaft 8. The engaging sleeve 11 is provided in a known manner with an internal thread 16 which engages a corresponding external thread 17 on the secondary shaft 8, so that rotation of the sleeve 11 on the shaft results in axial displacement of the sleeve 11. The thread is directed so as to achieve an amplification of the engaging force between the cooperating frictional surface 12, 14 or 13, 15.

The engaging sleeve 11 is made of bronze. Its conical frictional surfaces 12, 13 are coated with a layer of molybdenum, approximately 0.1 mm thick, which is sprayed onto the bronze surfaces and is not worked. The frictional surfaces 14, 15 of the gears 4, 5 are, in the example shown, made directly in the gears 4, 5 themselves, which are made in case hardened steel, but the frictional surfaces 14, 15 can also be made in separate rings joined to the gears.

We claim:

1. In a transmission device comprising a reverse gear for a boat motor, comprising a first shaft with a first gear non-rotatably fixed to the shaft, a second shaft mounted perpendicularly to the first shaft with two second gears freely rotatably mounted on said second shaft, and engaging the first gear and each having a individual inner conical frictional surface, and an engaging sleeve axially displaceable on the second shaft between said second gears, and having two outer conical frictional surfaces facing away from each other which each cooperates with an individual one of said inner frictional surfaces to alternatively lock the second gears to the second shaft; the improvement wherein each inner conical frictional surface (14,15) is a surface on a steel body (4,5), while the respective outer conical frictional surface (12,13) is a surface consisting essentially of a molybdenum layer on a bronze body (11), the respective outer conical frictional surface (12,13) being an unworked surface of a molybdenum layer which is sprayed onto the sleeve to a thickness of about 0.1 mm.

* * * * *